(12) United States Patent
Zheludev et al.

(10) Patent No.: US 8,717,659 B2
(45) Date of Patent: May 6, 2014

(54) TUNABLE METAMATERIALS AND RELATED DEVICES

(75) Inventors: Nikolay Ivanovich Zheludev, Southampton (GB); Eric Plum, Southampton (GB); Jun-Yu Ou, Southampton (GB)

(73) Assignee: University of Southampton, Southampton Hampshire (GB)

( * ) Notice: Subject to any disclaimer, the term of this patent is extended or adjusted under 35 U.S.C. 154(b) by 201 days.

(21) Appl. No.: 13/167,890

(22) Filed: Jun. 24, 2011

(65) Prior Publication Data

US 2012/0327502 A1 Dec. 27, 2012

(51) Int. Cl.
*G02B 26/00* (2006.01)
*G02F 1/01* (2006.01)
*G02B 1/00* (2006.01)

(52) U.S. Cl.
CPC .................... *G02B 1/007* (2013.01)
USPC ........................................... 359/291; 359/288

(58) Field of Classification Search
CPC ........ G02B 1/002; G02B 1/005; G02B 1/007; G02F 2202/30
USPC .................................................. 359/288, 291
See application file for complete search history.

(56) References Cited

U.S. PATENT DOCUMENTS

2008/0192331 A1* 8/2008 Wang et al. .................... 359/315

OTHER PUBLICATIONS

Y. Lee, H. Nam, S. Lee, J. Bu, J. Lee, PZT actuated micromirro for fine-tracking mechanism of high-density optical data storage, (2011) sensors and Acuators A 89 166-173.*

L.Wu and H. Xie, 124 degree rotation angle electrothermal micromirror with intergrared platinum heater, 2007, IEEE journal of selected topics in quantum electronics, 13, 2, 316-321.*
C. Pu, P. Chu, S. Lee, M Tsai, D Peale, N. Bonandeo and I. Brener, Electrostatic Actuation of three-deimensional mems mirror sidewall electrodes, IEEE journal of selected topics in quantum electronics, 10,3, 472-477.*
B.Ozbey and O.Aktas, Continously tunable terahertz metamaterial employing magnetically actuated cantilevers, optics express, 2011, 19,7, 5741-5751.*
Zheludev, "A Roadmap for Metamaterials", OPN Optics & Photonics News, Mar. 2011, pp. 30-35.
Chen et al., "Active terahertz metamaterial devices", Nature, vol. 444, Nov. 30, 2006, pp. 597-600.
Kanda et al., "Light-induced terahertz optical activity", Optics Letters, vol. 34, No. 19, Oct. 1, 2009, pp. 3000-3002.
Nikolaenko et al., "Carbon Nanotubes in a Photonic Metamaterial", The American Physical Society, Physical Review Letters, PRL 104, 153902 (2010), Apr. 16, 2010, pp. 153902-1-153902-4.

(Continued)

*Primary Examiner* — Scott J Sugarman
*Assistant Examiner* — Robert E Tallman
(74) *Attorney, Agent, or Firm* — Renner, Otto, Boisselle & Sklar, LLP

(57) ABSTRACT

A tunable metamaterial comprising a membrane on which is arranged a two-dimensional array of elements to form a metamaterial, wherein the array is subdivided into blocks of multiple elements, each block being separated from adjacent blocks by a gap to allow each block to be moveable relative to its adjacent blocks. The lattice of the metamaterial and hence its properties are tuned by inducing adjacent blocks to move away from each other or towards each other either in-plane or out-of-plane in a controllable manner in response to an electrical, thermal or optical control signal.

19 Claims, 12 Drawing Sheets

(56) References Cited

OTHER PUBLICATIONS

Sámson et al., "Metamaterial electro-optic switch of nanoscale thickness", Applied Physics Letters 96, 2010, pp. 143105-1-143105-3.
Driscoll et al., "Memory Metamaterials", Science, vol. 325, Sep. 18, 2009, pp. 1518-1521.
Wang et al., "Gate-Variable Optical Transitions in Graphene", Science, vol. 320, Apr. 11, 2008, pp. 206-209.
Zheludev, "The Road Ahead for Metamaterials", Science, vol. 328, Apr. 30, 2010, pp. 582-583.
Tao et al., "Reconfigurable Terahertz Metamaterials", The American Physical Society, Physical Review Letters, PRL 103, 147401 (2009), Oct. 2, 2009, pp. 147401-1-147401-4.
Zhu et al., "Switchable Magnetic Metamaterials Using Micromachining Processes", Advanced Materials, 23, 2001, pp. 1792-1796.
Prasanna et al., "Materials Selection and Design of Microelectrothermal Bimaterial Actuators", Journal of Microelectromechanical Systems, vol. 16, No. 2, Apr. 2007, pp. 248-259.
Lapine et al., "Structural tenability in metamaterials", American Institute of Physics, Applied Physics Letters 95, 2009, pp. 084105-1-084105-3.
Zhao et al., "Optical forces in nanowire pairs and metamaterials", Optics Express, vol. 18, 25, Dec. 6, 2010, pp. 25665-25676.

* cited by examiner

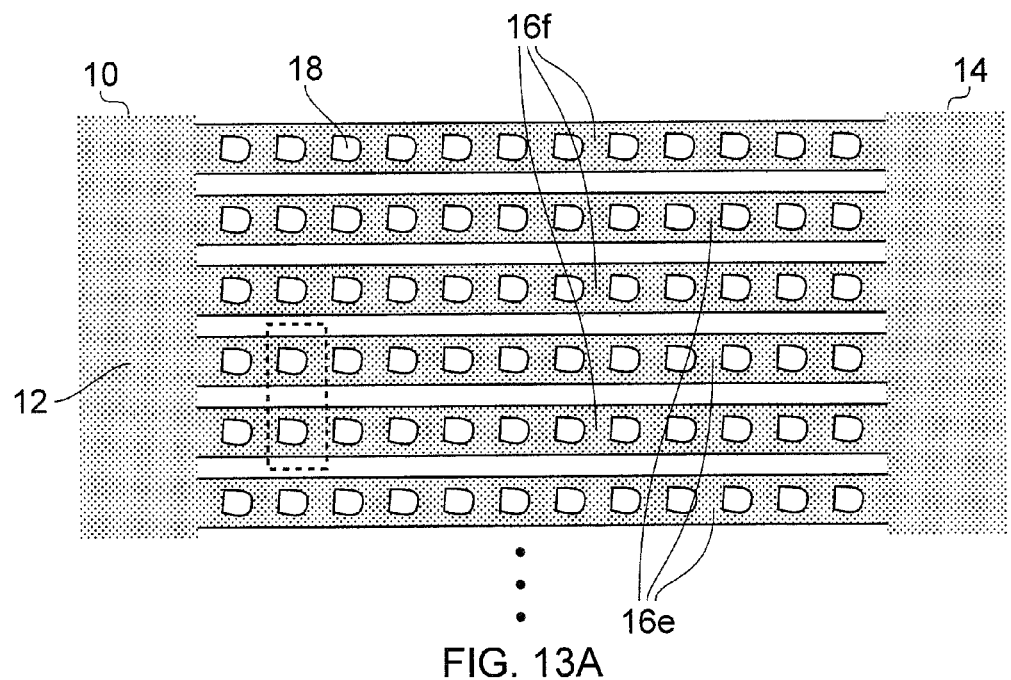
FIG. 13A
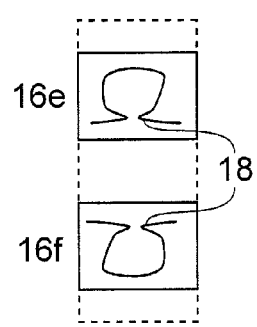 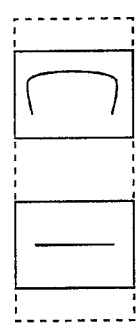 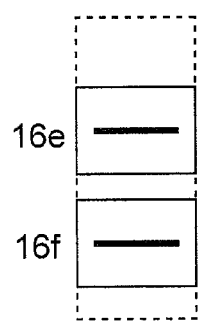 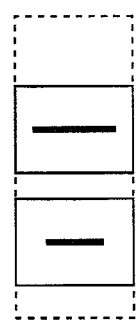
FIG. 13B      FIG. 13C      FIG. 13D      FIG. 13E

TUNABLE METAMATERIALS AND RELATED DEVICES

BACKGROUND OF THE INVENTION

This invention relates to tunable metamaterials, nonlinear metamaterials and related devices.

Switchable and tunable metamaterials are expanding areas of research driven by the development of nanophotonic all-optical data processing circuits, optical memory, smart surfaces, adaptable detection, imaging systems, and transformation optics devices [ref.1]. Several avenues are being explored. Metamaterials where metal nanostructures which support plasmons are hybridized with nonlinear and switchable layers provide a way to achieve high-contrast optical switching and enhanced nonlinear responses. Indeed, a change in the refractive index or absorption in a hybridized material will modify the plasmon spectrum of the nanostructure. This can lead to a strong change in the resonant transmission and reflection characteristics of the hybrid structure. For instance the ability to change a metamaterial's response at terahertz frequencies by injection or optical generation of free carriers in a semiconductor substrate has been reported [refs. 2,3]. A layer of single-wall semiconductor carbon nanotubes deposited on a metamaterial shows an order of magnitude higher nonlinearity than the already extremely strong response of the nanotubes themselves due to resonant plasmon-exciton interactions [ref. 4]. Nanoscale metamaterial electro-optical switches using phase change chalcogenide glass [ref. 5] and vanadium dioxide [ref. 6] have already been demonstrated. Graphene is also a popular material that promises to add electrooptical capability to metamaterials in particular in the infrared and terahertz domains by exploiting the spectral shift of the electromagnetic response that is driven by applied voltage [ref. 7,8].

When high-speed control is not needed, metamaterials can be reliably and reversibly controlled by using microelectromechanical (MEMS) actuators to reposition parts of the meta-molecules. MEMS-based metamaterials can provide continuous tuning, rather than steplike switching associated with phase-change materials and, in contrast to approaches exploiting optical nonlinearities, they are compatible with low intensities. This has been convincingly demonstrated for terahertz and far infrared metamaterials consisting of specially designed deformable meta-molecules [refs. 9,10]. It has also been proposed to tune metamaterials structurally through continuous adjustment of a metamaterial's lattice structure [ref. 12]. In ref. 12, this concept is demonstrated in the GHz region by a millimeter scale three-dimensional lattice formed by a vertical stack of circuit boards, each representing a two-dimensional metamaterial, where the tuning is provided by laterally shifting every other circuit board.

However, reconfigurable photonic metamaterials (RPMs) operating in the visible and near-infrared parts of the spectrum require the development of components and actuators operating on the scale of a few tens of nanometers rather than millimeters.

SUMMARY OF THE INVENTION

In one aspect, the invention provides a tunable metamaterial structure comprising a membrane having an area that is subdivided into a plurality of strips extending in a first dimension with neighboring strips being spaced apart in a second dimension by gaps, wherein the area hosts a metamaterial formed by an array of metamaterial elements which at least partially cover the area of the strips and define a plurality of lattice parameters of the metamaterial, and wherein at least selected ones of the strips are shaped and dimensioned to permit their motion in response to a control parameter, thereby to cause neighboring strips to move relative to each other and thereby perturb at least one lattice parameter of the metamaterial. In another aspect, the invention provides a tunable metamaterial device comprising a structure as specified above in combination with a device controller operable to set the control parameter.

This approach has the advantage that it does not depend on the details of the meta-molecule design and is thus applicable to a huge range of metamaterial patterns.

This approach also has the advantage that it eliminates the need for reconfigurable elements on the size scale of the meta-molecules, which would be extremely challenging to achieve for the optical part of the spectrum.

The strips preferably have a periodicity in the second dimension matched to a lattice parameter of the metamaterial in the second dimension. The matching can be a one-to-one matching or some other integer ratio.

The lattice parameters of the metamaterial may be smaller than one of 2000 nm, 1500 nm, 1250 nm, 1000 nm, 750 nm, 500 nm and 250 nm. In particular, embodiments of the invention are directed towards optical effects in the visible and near infra-red regions in which case by definition the lattice parameters of the metamaterial need to be smaller than the wavelengths in those regions. However, wavelengths smaller than lattice parameters may also be used, for example for operation as a tunable diffraction grating.

It is therefore possible to electro-mechanically, thermally or optically control the electromagnetic properties of metamaterials in the visible to near infrared spectral range. As the electromagnetic properties of almost any metamaterial depend on coupling between metamaterial resonators, control over the relative position of these resonators will lead to tuning of the metamaterial properties. In particular, control over resonator coupling can be achieved by placing the metamaterial resonators on reconfigurable support structures that move in different ways in response to an external stimulus used as a control parameter. In particular, in embodiments of the invention the metamaterial resonators are placed on alternating reconfigurable and non-reconfigurable support structures or alternating support structures that move away from each other or towards each other either in-plane or out-of-plane in a controllable manner in response to an electrical, thermal or optical control signal.

The proposed approach allows switchable and/or tunable and/or nonlinear properties to be added to a very large number of metamaterial devices, which could then replace the corresponding conventional optical components. Typically conventional devices that control the intensity, phase or polarization state of light are large devices that integrate weak effects over long distances in expensive crystals, for example modulators, polarization rotators and wave plates. Typically, tunability of such devices requires large additional components such as motors that move mechanical components or coils that generate an external magnetic field. The proposed approach will allow metamaterials of sub-wavelength thickness to be used to control and modulate the intensity, phase, polarization and frequency of light. Such metamaterial components can be mass-produced from cheap materials using standard semiconductor manufacturing techniques. They can be simply controlled by an applied voltage, temperature or electromagnetic wave and do not require large external components such as motors or coils. Thus the proposed approach will be particularly useful for the miniaturization of photonic devices and the realization of photonic circuits.

Tunability will be introduced in almost any metamaterial system, if the distance and thus the coupling between neighboring meta-molecules can be controlled. For example, this may be achieved by placing the meta-molecules on alternating reconfigurable and nonreconfigurable support structures.

In some embodiments, the membrane is provided with contacts to permit at least a subset of the strips to be electrically addressed with an electrical actuation signal which causes relative movement between neighboring strips. In particular, in electrostatically actuated embodiments, the contacts are arranged to apply mutually attractive and repulsive electrostatic forces laterally between neighboring strips, so that a first subset of the gaps widen and a second subset of the gaps interleaved with the first subset narrow under application of the electrical actuation signal. Alternatively, in electrothermally actuated embodiments, the contacts are arranged to apply a current to at least a first subset of the strips, and wherein at least a subset of the strips are made of a plurality of layers of different materials with different thermal expansion coefficients such that changes in temperature induced by the current cause bowing of those strips out of the plane of the membrane. Electrically actuated embodiments have the advantage that they can be realized with low operating voltages of a few volts.

In thermally actuated embodiments, at least a first subset of the strips are made of a plurality of layers of different materials with different thermal expansion coefficients such that changes in temperature cause bowing of those strips out of the plane of the membrane.

In optically actuated embodiments an optical signal causes relative movement of at least two subsets of strips. In particular, in optothermally actuated embodiments, at least a first subset of the strips are made of a plurality of layers of different materials with different thermal expansion coefficients such that changes of their temperature cause bowing of those strips out of the plane of the membrane, and a temperature change can be caused by an applied electromagnetic wave.

In a further optically actuated embodiment, actuation can be by electromagnetic forces. A first subset and a second subset of strips are at least partially covered by metamaterial elements configured to exert mutually attractive and/or repulsive lateral electromagnetic forces on one another when excited with an electromagnetic wave of an appropriate frequency, such that a first subset of gaps widens and a second subset of gaps interleaved with the first subset narrows under application of the electromagnetic wave. In either of the optically actuated embodiments, the optical actuation signal can be an optical signal that is manipulated by the metamaterial device, or an additional optical control signal. The latter case allows the manipulation of light with light.

The strips may have more flexible end portions to facilitate lateral motion of the strips in particular for the electrostatic embodiments and embodiments actuated by electromagnetic forces. The more flexible ended portions can be formed as folded structures or narrowed structures, for example.

At least selected ones of the strips can be provided with lateral protrusions facing into the gaps to inhibit large area contact between neighboring strips.

The strips can be formed as folded structures along their full length.

BRIEF DESCRIPTION OF THE DRAWINGS

This invention will now be further described, by way of example only, with reference to the accompanying drawings.

FIG. 13 is a schematic view of an electromagnetically controlled metamaterial structure according to a fourth embodiment.

DETAILED DESCRIPTION

A first embodiment is now described.

Figure 1:
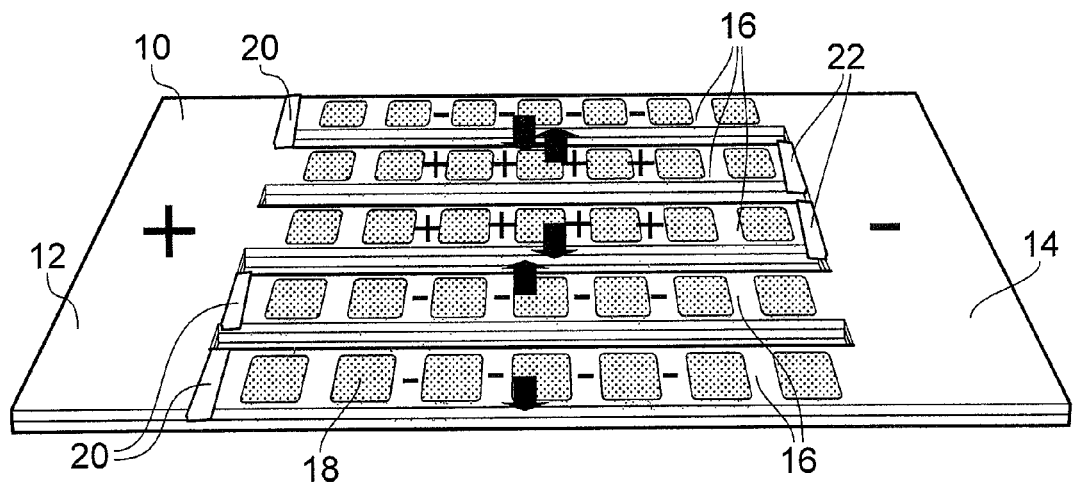
FIG. 1 is a schematic perspective view of an electrostatically controlled metamaterial structure according to a first embodiment.

FIG. 1 is a schematic perspective view of an electrostatically controlled metamaterial structure according to a first embodiment. The illustrated part is a free standing relatively thin layer of material 10, for example a membrane formed by conventional MEMS techniques by etching a thicker substrate. At least part of the material 10 is electrically conductive, for example due to presence of an electrically conductive coating such as an alloy or metal (such as gold) or a transparent conducting oxide (such as indium tin oxide). By relatively thin, it is meant sufficiently thin to display the electrically actuated elastic deformation properties described below. The thin layer or membrane 10 has an area which hosts a metamaterial defined by first and second end supports 12, 14 between which are formed a plurality of strips or bridge pieces 16 which extend parallel to each other in the x-direction. Each bridge piece 16 is separated in the y-direction from its adjacent or neighboring bridge piece by a gap formed by a slit or slot. It will be understood that these gaps can be formed in a solid membrane by etching or milling using conventional semiconductor fabrication techniques.

A metamaterial is formed over the membrane 10 and specifically over at least part of the area covered by the bridge pieces 16. Each "atom" or "molecule" 18 of the metamaterial "lattice" is indicated with the squares with rounded corners. A plurality of meta-molecules is arranged along each bridge piece having a characteristic separation in the x-direction. The neighboring meta-molecules on adjacent bridge pieces also have a characteristic separation in the y-direction, thereby forming a two-dimensional (2D) lattice. The x- and y-separations could be the same as illustrated, or could be different. Moreover, the square grid shown could instead be a hexagonal close packed grid, i.e. compared to the illustration the meta-molecules on each second bridge piece could be shifted in the x-direction by half a period. The meta-molecules can be formed in a conventional manner, e.g. by structuring a metallic film. Materials and structure options for forming the metamaterial are discussed further below.

A plurality of first and second bridge-specific electrical disconnects 20, 22 (for example gaps in the electrically conductive layer) are arranged on the first and second end supports 12, 14 respectively at the junction between the end support and the bridge piece, so that first and second subsets of bridge pieces are only contacted on one end. The first subset of bridge pieces is electrically connected to the first end support which is connected to a positive voltage terminal and the second subset of bridge pieces is electrically connected to the second end support which is connected to a negative voltage terminal. The electrical disconnects 20, 22 are arranged so that oppositely charged potentials can be applied to neighboring bridge pieces 16 so that those neighboring bridge pieces will attract (or repel) each other when potentials of the opposite (or the same) sign are applied via the end supports. In the illustrated example, the first and second electrical disconnects are arranged in alternating pairs along the rows of bridge pieces. The attractive and repulsive forces generated electrostatically are sufficiently strong to displace the bridge pieces in the y-direction as schematically indicated with the arrows, thereby widening and closing the gaps alternately from row to row. This has the effect of altering the metamaterial lattice, since it changes the y-separation between meta-molecules. It is this property that leads to the tunable device function. The effect is reversible, since the displacement of the bridge pieces is by elastic deformation, so a restoring force exists which is proportional to the y-displacement, while the electrostatic force between bridge pieces grows infinite as their separation approaches zero. The application of an electrostatic potential will therefore result in a switching behavior when the electrostatic attraction between neighboring bridge pieces overcomes the elastic restoring force, leading to a step change in the metamaterial's electromagnetic properties over a short range of applied voltage. In other devices, a continuous tuning range may be preferred. The elastic properties of the bridge pieces, the gap width and other parameters may be chosen to promote either a binary switching type operation or operation based on a continuous variation of the gap with applied voltage.

Figures 2A, 2B:
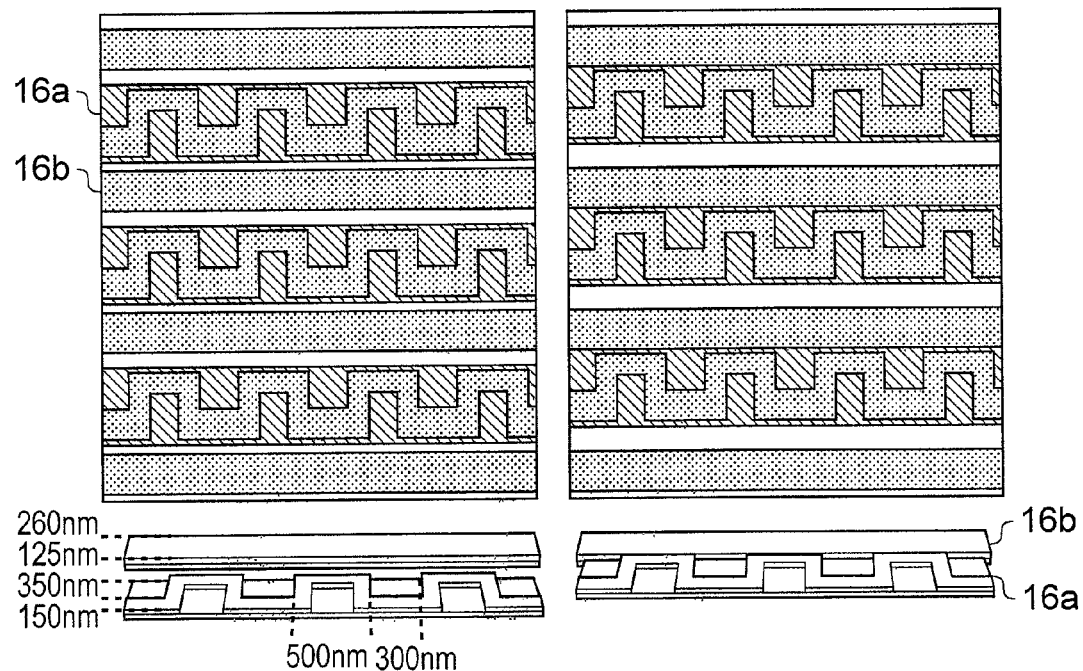
FIG. 2(a) shows in plan view a scanning electron micrograph of an example structure of the first embodiment in its rest position or "OFF" state.
FIG. 2(b) corresponds to FIG. 2(a), but shows the same structure in its fully actuated position or "ON" state.

FIG. 2(a) shows in plan view a scanning electron micrograph of an example structure of the first embodiment in its rest position or "OFF" state. FIG. 2(b) corresponds to FIG. 2(a), but shows the same structure in its fully actuated position or "ON" state. This example of an electrically controlled reconfigurable photonic metamaterial has 35 nm long silicon nitride bridges alternatingly covered with either nanoscale "fishscale"-shaped plasmonic resonators 16a or continuous gold wires 16b. The "fishscale"-shaped plasmonic resonators 16a are formed of a meandering metal track of width in the y-direction of 150 nm for the y-extending portions and a width of 100 nm in the x-direction for the x-extending portions. The meanders have a 800 nm period in the x-direction. The gold wires 16b have a width of 260 nm. The entire structure was fabricated by focused ion beam milling from a 50 nm thick silicon nitride membrane covered by a 50 nm thick thermally evaporated gold layer. The bridge pieces were separated by 125 nm gaps for electrical isolation and pairs of bridges were alternatingly connected to two electrical contacts for electrostatic control of the device. A voltage applied to the metamaterial device leads to alternating attractive and repulsive electrostatic forces between "fishscale" and "wire"-bridges. At small voltages the electrostatic forces are in equilibrium with the restoring force of the elastic bridges leading to only small displacements. However, as the restoring force is proportional to the bridge displacement, while the electrostatic forces become infinite when the bridge separation approaches zero, there is a threshold voltage where the electrostatic force overcomes the restoring force. At the threshold voltage, the structure switches into a bridge-pair configuration, compare FIGS. 2(a) and (b), showing the "off" and "on"-states respectively. In this example, the threshold voltage $U_{th}$=5.7 V.

Figure 3:
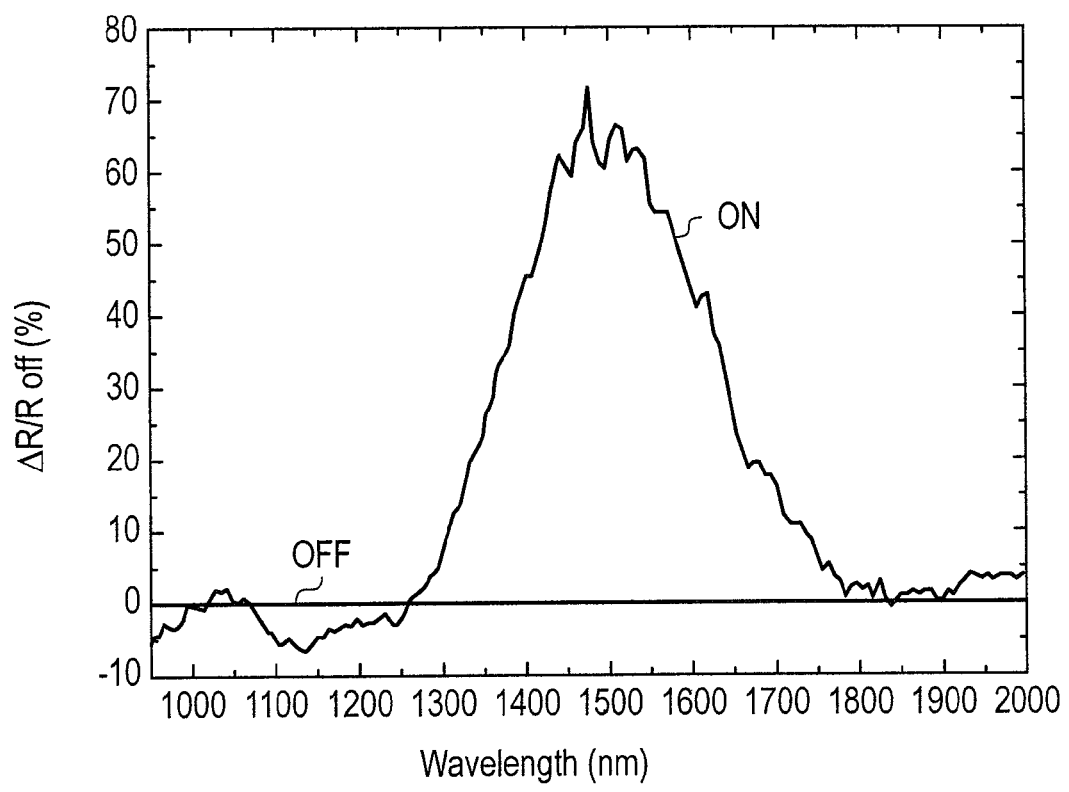
FIG. 3 is a graph showing the change in reflectivity R as a function of wavelength when the example device is in its OFF and ON states as shown in FIGS. 2(a) and 2(b) respectively.

FIG. 3 is a graph showing the change in reflectivity R as a function of wavelength when the example device is in its OFF and ON states as shown in FIGS. 2(a) and 2(b) respectively. As can be seen from the graph, switching of the metamaterial state leads to dramatic changes of the metamaterial's reflection properties. Switching the metamaterial to its "on"-state by applying a voltage above $U_{th}$ increases its reflectivity by 72% in the telecommunications band around 1.5 μm. This large change in reflectivity is linked to a resonant mode of the coupled system of fishscale structure and straight wires. The resonant properties of this system strongly depend on coupling between neighboring bridges and switching the metamaterial to its "on"-state red-shifts the resonance by about 15% as the plasmonic structures are moved together by electrostatic forces.

Figure 4:
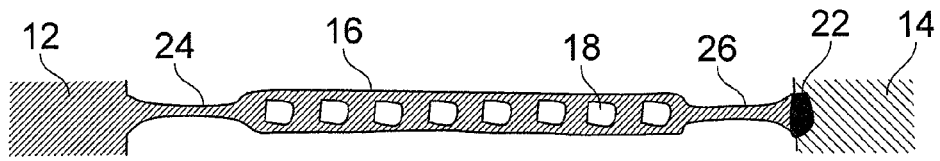
FIG. 4 shows a modified bridge piece in which the main central part of the bridge piece is connected to the support structure with waisted portions.

FIG. 4 shows a modified bridge piece 16 in which the main central part of the bridge piece is connected to the two sides of the support structure 12, 14 with first and second waisted portions 24, 26. The waisted, narrowed or thinned portions 24, 26 may be thinned relative to the central part of the bridge only in the y-dimension visible in the schematic plan view, or optionally also in the depth or z-dimension. An electrical disconnect 22 is also shown. These structurally modified end portions facilitate easier movement of the bridge structure in response to the external electrical, thermal or optical (electromagnetic) stimulus. For example, the ends of the bridges can have a reduced width within the metamaterial plane as illustrated to make it easier for the structure to bend within the metamaterial plane.

Figure 5:
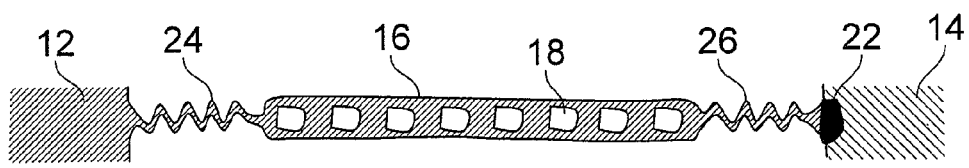
FIG. 5 shows a modified bridge piece in which the bridge is connected to the support structure with waisted portions formed of concertina portions.

FIG. 5 shows a modified bridge piece 16 in which the bridge is connected to the support structure 12, 14 with waisted portions 24, 26 formed of concertina portions capable of changing their length and also of allowing lateral displacement between their ends, with little force. An electrical disconnect 22 is also shown. As shown in this figure, the shape of the bridge-to-support connecting parts may be modified to facilitate easier bending and stretching. As illustrated, a concertina or spring-like meandering structure can be used for the end parts of the bridges. It would also be possible to provide a special end bridge portion of the kind shown in FIG. 4 and FIG. 5 only at one end.

Figure 6:
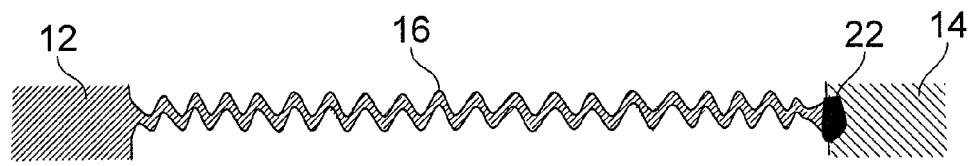
FIG. 6 shows a modified bridge piece in which the whole bridge has a concertina form.

FIG. 6 shows a modified bridge piece in which the whole bridge 16 has a concertina form. In this case the pitch of the spring or concertina structure, i.e. the x-period of its folds, may also be matched to, or take on the role of, the metamaterial resonator. The reference numerals follow those of previous figures for corresponding parts.

Figure 7:
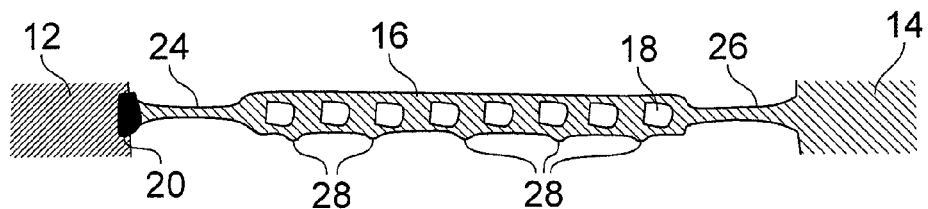
FIG. 7 shows a further modified bridge piece similar to FIG. 4, but with laterally extending bumps or protrusions arranged on one side surface of the bridge piece.
Figure 8A:
FIG. 8A-8I are schematic drawings of alternative "atom" or "meta-molecule" forms for the metamaterial structure.
Figure 8B:
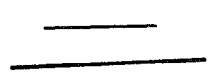
Figure 8C:
Figure 8D:
Figure 8E:
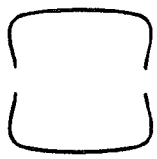
Figure 8F:
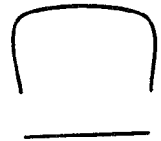
Figure 8G:
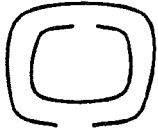
Figure 8H:
Figure 8I:
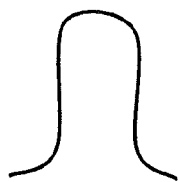

FIG. 7 shows a further modified bridge piece similar to FIG. 4, but with laterally extending bumps or protrusions 28 arranged on one side surface of the bridge piece. Alternatively, the bumps could be arranged on both side surfaces in which case only every other bridge piece would need to be provided with the bumps. The bumps 28 extend outwards from the bridge within the metamaterial plane in one or in several places. In particular, they can fulfill the following roles:
  define a minimum bridge separation;
  prevent electrical short-circuits in electrostatically tunable metamaterial in the case that the bumps are made from non-conducting material; and
  prevent neighboring bridges from joining or sticking together which could otherwise happen in electrostatically or electromagnetically (optically) tunable metamaterials if the electrostatic/electromagnetic forces overcome the elastic restoring force of the bridges (electromagnetically tunable embodiments of the invention are described later).

It will be understood that the bumps could also be provided with a bridge piece of the type shown in FIG. 5 or other bridge forms, not only the one illustrated in FIG. 7.

FIG. 8A-8I are schematic drawings of alternative "atom" or "meta-molecule" forms for the metamaterial structure. Each pattern may exist in equivalent "positive" and "negative" forms. For example, in the case of FIG. 8A, the positive form may be a 2D array of conductive wire portions deposited on an insulating substrate, whereas the corresponding negative form is made of slits in a plasmonic film having the same positions as the wires in the positive form. Usually "wire" versions will require a substrate for support, whereas the slit versions can be implemented either on a supporting substrate or as self-supporting metal or degenerate semiconductor structures without a substrate.

The alternative "atom" or "meta-molecule" forms in FIGS. 8A-8I are:
  A Slit or wire dipole resonator
  B Pair of wires or slits of different lengths
  C "C"-shaped resonator
  D Split ring
  E Symmetrically split ring
  F Asymmetrically split ring
  G Double split ring
  H Omega particle
  I Fishscale element The "atoms" or "meta-molecules" on the same bridge may be spaced or may touch. In particular, the forms in FIGS. 8A and 8I may touch to form continuous metal wires or continuous slits.

The "atoms" or "meta-molecules" themselves may be arranged in a number of different kinds of arrays. The figures relating to the above described embodiments show a square array with a one-to-one mapping of array row to bridge piece. A wide variety of choices is however possible. For example, multiple rows may be provided on each bridge piece. Moreover, the alignment of features between adjacent rows/bridges may be staggered, for example a hexagonal close-packed array could be used so that the "atoms" or "meta-molecules" of adjacent rows are offset. Furthermore, the metamaterial structure may be formed by more than one type of "atoms", for example alternating rows of two "atoms" with different shape, structure or orientation may be used.

Examples of plasmonic materials that are suitable for implementing the invention are: gold, silver, aluminum, copper or an alloy of one or more of these metals that may contain further metal(s). Moreover, transparent conducting oxides, such as indium tin oxide, fluorine doped tin oxide (FTO) or doped zinc oxide. Graphene may also be used.

Examples of suitable dielectrics for the bridge pieces and adjacent structure include: silica, silicon nitride and various polymers.

Various other materials may also be used as part of the overall structure including:
  Semiconductors (e.g. silicon, gallium arsenide, germanium, . . . )
  Gain media (e.g. erbium doped glass, quantum dots, . . . )
  Non-linear material
  Switchable media
  Phase-change material (e.g. gallium lanthanum sulfide—GLS)
  Stretchable/elastic material To summarize, the structure of the first embodiment comprises two or more species of alternating bridges. At least two species of bridges are electrically conductive and electrically connected to the support structures on opposite sides, so that different electric potentials can be applied to these two species of bridges. At least one species of bridges deforms within the metamaterial plane due to attractive and/or repulsive electrostatic forces resulting from an applied electric potential difference (voltage). The structure can be controlled by DC, AC or otherwise modulated voltages. The species of bridges can differ, for example with respect to: their number of layers, constituent materials, layer thicknesses and their shape and structuring.

A second embodiment is now described.

Figure 9A:
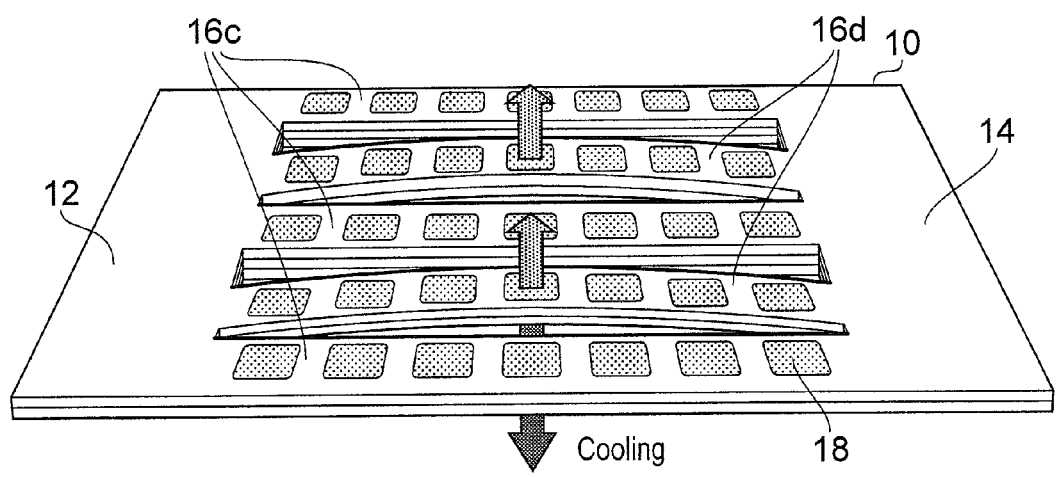
FIG. 9(a) is a schematic perspective view of a thermally controlled metamaterial structure comprising alternating bimaterial bridges according to a second embodiment.

FIG. 9(a) is a schematic perspective view of a thermally controllable metamaterial structure according to a second embodiment. The illustrated part is a free standing relatively thin layer of material 10, for example a membrane formed by conventional MEMS techniques by etching a thicker substrate. By relatively thin, it is meant sufficiently thin to display the thermally actuated elastic deformation properties described below. The thin layer or membrane 10 has first and second end supports 12, 14 between which are formed a plurality of bridge pieces 16c, 16d which extend parallel to each other in the x-direction. Each bridge piece 16c, 16d is separated in the y-direction from its adjacent or neighboring bridge piece by a gap or slot. It will be understood that these gaps can be formed in a solid membrane by etching or milling using conventional semiconductor fabrication techniques.

A metamaterial is formed over the membrane 10 and specifically over at least part of the area covered by the bridge pieces 16c, 16d. Each "atom" or "molecule" 18 of the metamaterial "lattice" is indicated with the squares with rounded corners. A plurality of meta-molecules is arranged along each bridge piece having a characteristic separation in the x-direction. The neighboring meta-molecules on adjacent bridge pieces also have a characteristic separation in the y-direction, thereby forming a two-dimensional (2D) lattice. The x- and y-separations could be the same as illustrated, or could be different. Moreover, the square grid shown could instead be a hexagonal close packed grid, i.e. compared to the illustration the meta-molecules on each second bridge piece could be shifted in the x-direction by half a period. The meta-molecules can be formed in a conventional manner, e.g. by structuring a metallic film. Materials and structure options for forming the metamaterial are discussed further below. In this embodiment, the thermally tunable metamaterial support structure comprises alternating reconfigurable and nonreconfigurable bimaterial bridges.

Figure 9B:
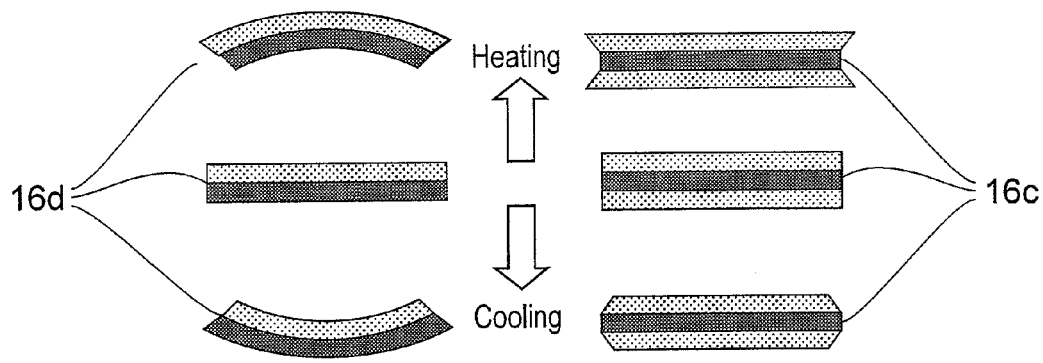
FIG. 9(b) are schematic sections of bilayered (left) and trilayered (right) support beams made of materials with different thermal expansion coefficients used to illustrate the second embodiment.

FIG. 9(b) are schematic sections of bilayered (left) and trilayered (right) bimaterial support beams which form the bridges 16d and 16c respectively. Each beam 16c, 16d is made of two materials, one with a large thermal expansion coefficient (shown light), e.g. gold or another plasmonic material, and the other with a small thermal expansion coefficient (shown dark), e.g., silicon nitride or another dielectric material. The bilayer support beams illustrated on the left side will bend in response to temperature changes. Heating is shown by the shaded arrow and cooling by the non-shaded arrow. Similar arrows are also included in FIG. 9(a). By contrast, the trilayered support beams shown on the right side of the figure do not exhibit thermally induced bending since there are equal contributions from the large thermal expansion coefficient material above and below the low thermal expansion material. Bending of the bimaterial structure is thus caused by differential thermal expansion of the constituent materials. On the other hand, nonreconfigurable support structures are provided by using a symmetric sequence of layers such as a metal-dielectric-metal three-layer structure as illustrated.

Heating or cooling the device therefore changes the lattice of the metamaterial by changing the separation between meta-molecules in neighboring bridge pieces which will tend to change properties of the system, in particular resonant properties, which depend on coupling between neighboring bridge pieces. Heating or cooling can be achieved by any convenient method, such as control of the ambient temperature, or application of an electromagnetic wave (including optical frequencies).

In alternative forms, the non-deforming beams 16c could be made of any other symmetric layer sequence to avoid thermally induced bending. In other alternatives the beams 16c could be inverted bilayered beams made to bow oppositely in response to temperature changes compared with the beams 16d. A further alternative would be to form the non-bowing beams 16c out of a single material type, such as a dielectric.

Figure 10A:
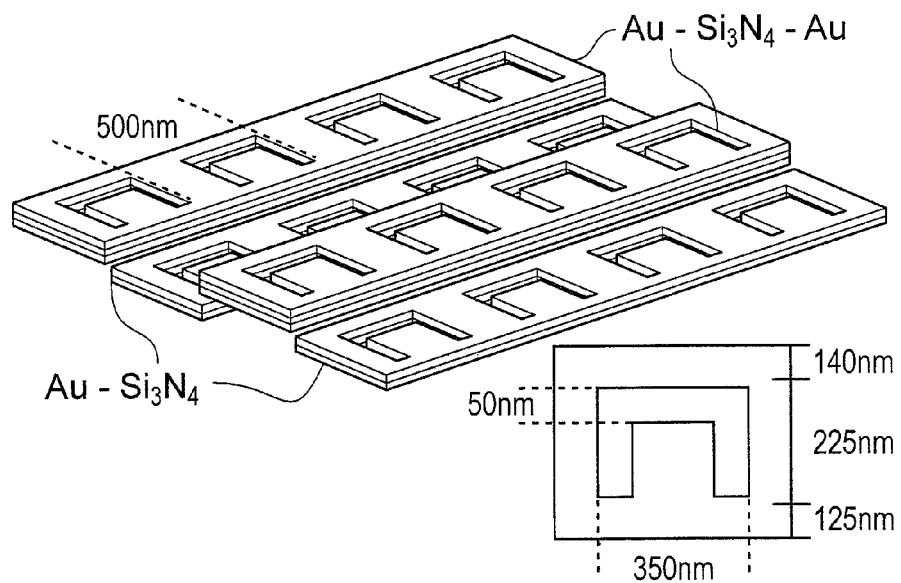
FIG. 10(a) is a schematic perspective view of a thermally controlled reconfigurable photonic metamaterial according to the second embodiment.

FIG. 10(a) is a schematic perspective view of an example thermally controlled reconfigurable photonic metamaterial of the second embodiment. The metamaterial is made of nanoscale "C"-shaped aperture plasmonic resonators (split rings) supported by alternating thermally reconfigurable and non-reconfigurable bridges. Because of the patterned and unpatterned gold layers on their front and back, the "non-reconfigurable" support structures will bend slightly in the opposite direction to the "reconfigurable" support structures in response to changes of the ambient temperature. The entire structure was fabricated by focused ion beam milling from a 100 nm thick silicon nitride membrane covered by 50 nm thick thermally evaporated gold layers on both sides. In order to create reconfigurable and nonreconfigurable support structures, the gold underlayer was removed from every second bridge. Next the "C"-slit plasmonic resonator pattern was milled into the gold layer covering the front of the membrane. Finally the metamaterial membrane was cut into 50 μm long and 490 nm wide bridges separated by 110 nm gaps.

Figure 10B:
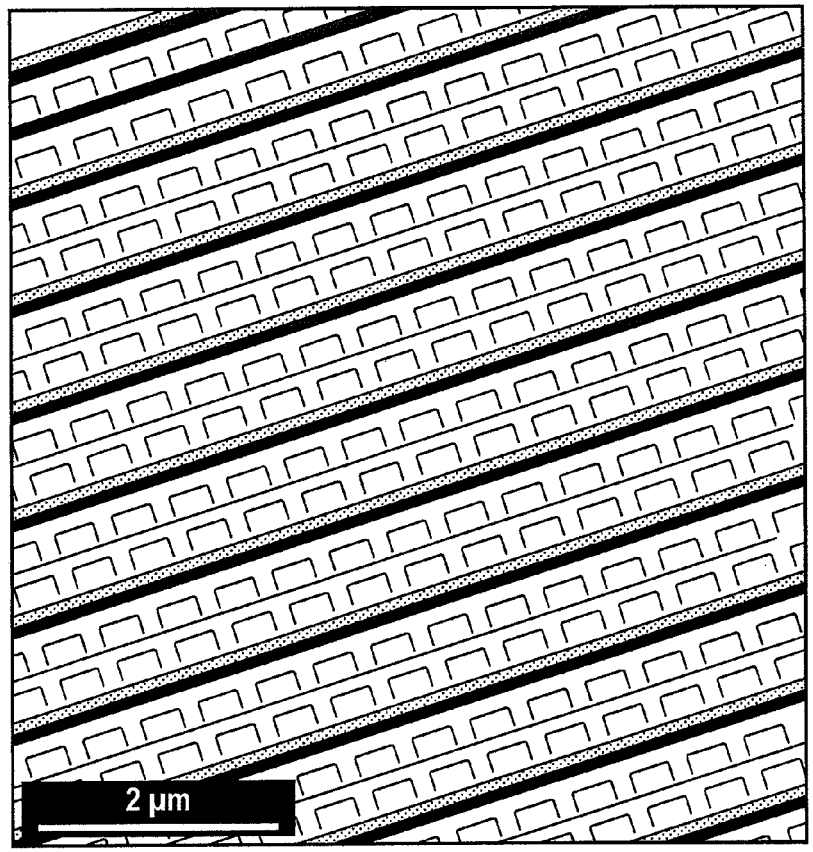
FIG. 10(b) is a scanning electron micrograph corresponding to FIG. 10(a) taken at room temperature of an example metamaterial structure of the second embodiment.

FIG. 10(b) is a corresponding scanning electron micrograph taken at room temperature of the example structure. Because of the large thermal expansion coefficient of gold $(14.4 \times 10^{-6}/K)$, which exceeds that of silicon nitride $(2.8 \times 10^{-6}/K)$ by a factor of 5, the metamaterial bridges without gold underlayer will arch upward (downward) upon heating (cooling) [ref. 11] as can be seen by the lowered bridges in the scanning electron micrograph. On the other hand, thermal bending is suppressed for the more symmetric bridges with gold underlayer, which are raised in the scanning electron micrograph. The metamaterial properties are position-dependent toward the end of the support structures, where the spacing between the metamaterial resonators gradually decreases. Therefore the results are taken from the central portion of the structure, which is relatively homogeneous and experiences the largest temperature-dependent changes.

Figure 11A:
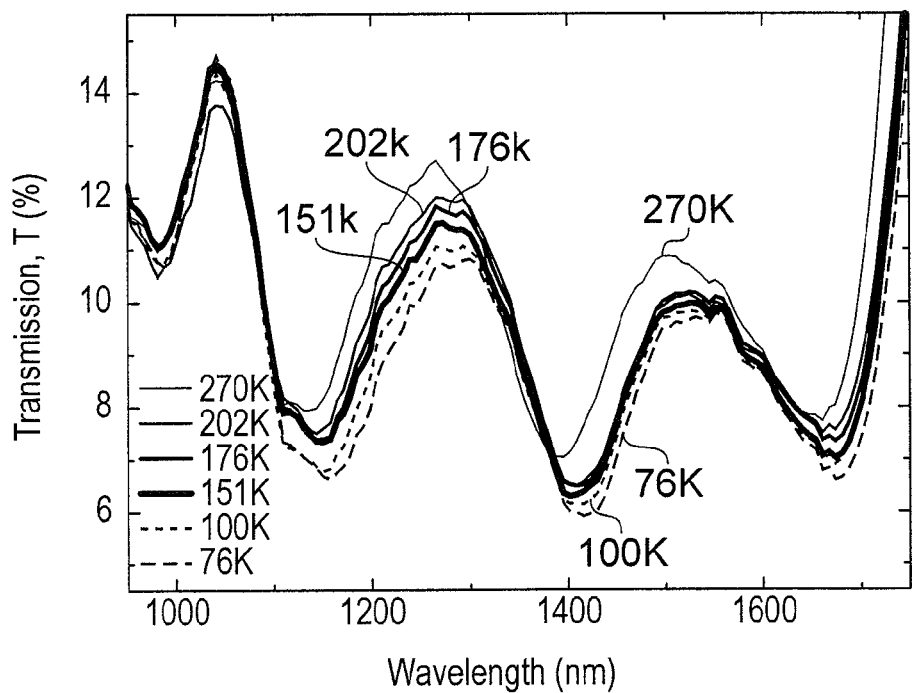
FIG. 11(a) is a graph of transmission T as a function of wavelength for the example metamaterial structure of FIG. 10(b).

FIG. 11(a) is a graph of transmission T as a function of wavelength for the metamaterial for waves polarized perpendicular to the supporting beams.

Figure 11B:
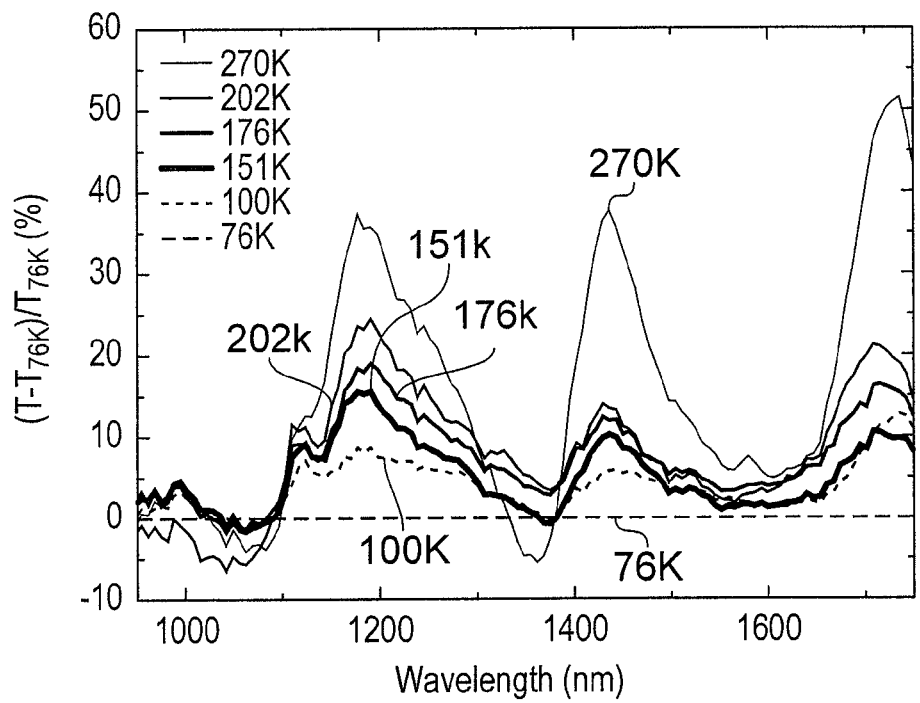
FIG. 11(b) is a graph of the relative change in transmission T as a function of wavelength at six different temperatures normalized to a reference temperature of 76 K for the example metamaterial structure of FIG. 10(b).

FIG. 11(b) is a graph of the relative change in transmission T as a function of wavelength for waves polarized perpendicular to the supporting beams, with each trace representing a different metamaterial temperature. Each trace shows the change in transmission relative to a reference temperature of 76 K.

The metamaterial's temperature-dependent transmission spectrum was measured using a microspectrophotometer (CRAIC Technologies) equipped with a cryostatic sample stage. It reveals that the structure has resonant transmission minima in the near-infrared at about 1140, 1400, and 1670 nm. The resonant modes themselves are quite complex excitations of the coupled system of "C"-slit resonators and the gold underlayer on every second bridge. Importantly, the resonant properties of this system strongly depend on the coupling between neighboring bridges and therefore a continuous change of the physical configuration of the nanostructure drives a dramatic change of its optical properties.

FIG. 11(b) shows the change of the reconfigurable metamaterial's transmission characteristics at various values of temperature, each shown relative to a reference temperature of 76 K. As the metamaterial is heated to 270 K, we observe dramatic 37, 38, and 51% relative increases of its transmission near its resonant transmission minima at 1180, 1435, and 1735 nm, respectively. These remarkably large relative increases in transmission are due to a 20 nm blue shift of the metamaterial spectrum combined with an overall transmission increase as the plasmonic resonators are moved closer together by differential thermal expansion driven by the ambient temperature increase. Importantly, as the structure is cooled back to its initial temperature of 76 K these changes of its transmission spectrum are reversed, indicating that the reconfigurable metamaterial returned to its initial state.

For practical applications, it may be important to achieve a large range tuning of the metamaterial properties with a much smaller temperature change. This may be achieved with longer and thinner reconfigurable support structures and optimized material choices and layer thicknesses, as the mechanical tuning range of the reconfigurable bimaterial beams is proportional to $\Delta T \Delta \alpha L t$, where $\Delta T$ and $\Delta \alpha$ are the temperature and thermal expansion coefficient differences and $L/t$ is the length/thickness aspect ratio of the support structures. We chose gold for its good plasmonic properties and silicon nitride for its easy availability in form of membranes of nanoscale thickness. However, silicon nitride could be replaced by glass, which has a significantly smaller thermal expansion coefficient of only $0.4 \times 10^{-6}/K$ [ref. 11]. Furthermore, intermetamolecular coupling could be enhanced by placing the supporting beams closer together and the relative thermal displacement of neighboring resonators could be doubled by alternating metal-on-dielectric and dielectric-on-metal reconfigurable structures, which would bend in opposite directions.

In summary of the second embodiment, it uses metal-dielectric films of nanoscale thickness to provide a generic platform for achieving large-range continuous reversible tuning of metamaterial properties in the optical part of the spectrum. By placing metamaterial resonators (meta-molecules) on a thermally reconfigurable bimaterial structure it is possible to control intermetamolecular coupling leading to a reversible change of the metamaterial's transmission. In a specific example, relative transmission changes of up to 50% have been observed. Moreover, the various generalization and materials choices described above in relation to the first embodiment apply also to the second embodiment. The structure comprises two or more species of alternating bridges, which deform differently out of the metamaterial plane in response to temperature changes. Deformation in at least one species of bridges is caused by differential thermal expansion between two or more constituent materials. The structure can be controlled by the ambient temperature or by heat delivered by an electromagnetic wave (optical control). The species of bridges can differ, for example with respect to: their number of layers, constituent materials, layer thicknesses and their shape and structuring.

A third embodiment is now described.

Figure 12:
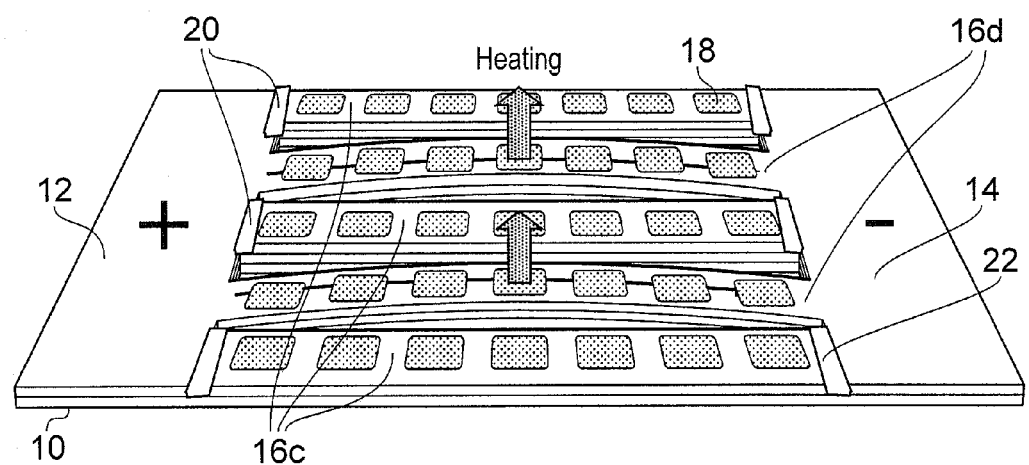
FIG. 12 is a schematic perspective view of an electrothermally controlled metamaterial structure according to a third embodiment.

FIG. 12 is a schematic perspective view of an electrothermally controllable metamaterial structure according to the third embodiment. The illustrated part is a free standing relatively thin layer of material 10, for example a membrane formed by conventional MEMS techniques by etching a thicker substrate. By relatively thin, it is meant sufficiently thin to display the thermally actuated elastic deformation properties described below. The thin layer or membrane 10 has first and second end supports 12, 14 between which are formed a plurality of bridge pieces 16c, 16d which extend parallel to each other in the x-direction. Each bridge piece 16c, 16d is separated in the y-direction from its adjacent or neighboring bridge piece by a gap or slot. It will be understood that these gaps can be formed in a solid membrane by etching or milling using conventional semiconductor fabrication techniques.

A metamaterial is formed over the membrane 10 and specifically over at least part of the area covered by the bridge pieces 16c, 16d. Each "atom" or "molecule" 18 of the metamaterial "lattice" is indicated with the squares with rounded corners. A plurality of meta-molecules is arranged along each bridge piece having a characteristic separation in the x-direction. The neighboring meta-molecules on adjacent bridge pieces also have a characteristic separation in the y-direction, thereby forming a two-dimensional (2D) lattice.

In this embodiment, the electrothermally tunable metamaterial support structure comprises alternating reconfigurable bridges 16d and nonreconfigurable bridges 16c.

The structure of at least one of the bridge types (preferably the reconfigurable bridges 16d), includes one or more electrically conductive layers (for example a metal or a transparent conducting oxide), which can be heated by currents flowing through the electrically conductive layer(s) applied by contacts to the end supports 12, 14 via a current source or voltage source.

The electrothermally reconfigurable support structures 16d are made of two or more layers of materials with different thermal expansion coefficients. Bending or bowing of the beams 16d is induced when the structure is heated by currents flowing through the electrically conductive layer(s) of the same and/or nearby bridges.

In the illustrated example, the electrically conductive link between the end supports and the non-deforming beams 16c is broken by spacing areas 20, 22 at the junction between the end supports and the bridge pieces 16c. Current is therefore prevented from flowing along bridges 16c, so these bridges are not subjected to electrically induced heating. The beams 16c can then be made of the same structure as beams 16d. Alternatively, the non-deforming beams can be made of a structure which will not deform when heated. This can be achieved by making the non-deforming beams out of a single layer or a symmetric sequence of layers so that there is no bending out of the metamaterial plane in response to temperature changes.

In another alternative form, the beams 16c and 16d may bend in opposite directions, for example by using inverted layer sequences, such as metal on dielectric and dielectric on metal.

To summarize, the structure of the third embodiment comprises two or more species of alternating bridges. At least one species of bridges is electrically conductive and can be heated by electrical currents passing through it. At least one species of bridges deforms out of the metamaterial plane in response to temperature changes due to differential thermal expansion between two or more constituent materials. The structure can be controlled by DC, AC or otherwise modulated currents. The species of bridges can differ, for example with respect to: their number of layers, constituent materials, layer thicknesses and their shape and structuring. Moreover, the various generalization and materials choices described above in relation to the first embodiment apply also to the third embodiment.

A fourth embodiment is now described.

FIG. 13(a) is a schematic view of an optically (electromagnetically) controllable metamaterial structure according to a fourth embodiment. The illustrated part is a free standing relatively thin layer of material 10, for example a membrane formed by conventional MEMS techniques by etching a thicker substrate. By relatively thin, it is meant sufficiently thin to display the optically actuated elastic deformation properties described below. The thin layer or membrane 10 has first and second end supports 12, 14 between which are formed a plurality of bridge pieces 16e, 16f which extend parallel to each other in the x-direction. Each bridge piece 16e, 16f is separated in the y-direction from its adjacent or neighboring bridge piece by a gap or slot. It will be understood that these gaps can be formed in a solid membrane by etching or milling using conventional semiconductor fabrication techniques.

A metamaterial is formed over the membrane 10 and specifically over at least part of the area covered by the bridge pieces 16e, 16f. Each "atom" or "molecule" 18 of the metamaterial "lattice" is indicated with the squares with rounded corners. A plurality of meta-molecules is arranged along each bridge piece having a characteristic separation in the x-direction. The neighboring meta-molecules on adjacent bridge pieces also have a characteristic separation in the y-direction, thereby forming a two-dimensional (2D) lattice. Each meta-molecule is a plasmonic resonator.

In this embodiment, the optically tunable metamaterial support structure comprises alternating reconfigurable bridges 16e and 16f.

Charge oscillations can be excited within the plasmonic resonators by an incident electromagnetic wave. The electromagnetic wave can be a dedicated electromagnetic control signal such as an optical wave applied to the metamaterial structure, or it may be an incident optical signal which it is intended that the metamaterial structure will manipulate (see, for example, possible optical devices for manipulation of optical signals shown in FIGS. 14-21 described below). This latter alternative is attractively simple since no additional external stimulus is required for tuning. The charge oscillations are associated with optically induced currents and charges which lead to attractive and/or repulsive electromagnetic forces between neighbouring bridges, which control the spacing between the bridges in the plane of the membrane. (For pairs of fixed plasmonic resonators, such forces have been studied numerically in ref. 13.) If there is a net electromagnetic force on at least one group of bridges, the structure is tuned by the action of the applied electromagnetic wave. In order to produce a net electromagnetic force on at least one family of bridges, the plane containing the direction normal to the metamaterial plane and the center line of one of said bridges must not be a mirror plane of the structure. This can be achieved by having different plasmonic resonators ("atoms") on adjacent bridges, or by having bridges with the same resonator type that are spaced apart by gaps that are alternately large and small, or by combinations of these arrangements.

FIGS. 13(b) to 13(e) show examples of suitable unit cell arrangements, shown as pairs of plasmonic resonators 18 on neighboring bridges 16e, 16f. FIG. 13(b) shows identical right-side-up and up-side-down plasmonic resonators without two-fold rotational symmetry on otherwise identical neighboring bridges. FIG. 13(c) shows different plasmonic resonators, at least one of which does not have two-fold rotational symmetry, on otherwise identical bridges. FIG. 13(d) shows identical plasmonic resonators on identical bridges, where the gaps in between the bridges are alternately small and large. FIG. 13(e) shows different plasmonic resonators on identical bridges, where the gaps in between the bridges are alternately small and large. In all cases the plasmonic resonators can be realized as wires consisting of a plasmonic material or as apertures in a film consisting of a plasmonic material.

To summarize, the structure of the fourth embodiment comprises two or more species of alternating bridges. For at least one species of bridge, optical excitation of its plasmonic resonators leads to a net electromagnetic force between said bridges and the neighboring bridges. As a result, at least one species of bridge deforms within the metamaterial plane in response to an electromagnetic wave incident on the structure. The structure can be controlled by an optical control signal or by an optical signal that the structure is intended to manipulate. Such optical signals can be continuous, pulsed or otherwise modulated. The species of bridges can differ, for example with respect to: their number of layers, constituent materials, layer thicknesses and their shape, width and structuring. Moreover, the various generalization and materials choices described above in relation to the first embodiment apply also to the fourth embodiment.

In summary of the above-described embodiments, metamaterial resonators are placed on alternating reconfigurable and non-reconfigurable support structures or alternating support structures that move away from each other or towards each other either in-plane (first and fourth embodiment) or out-of-plane (second and third embodiments) in a controllable manner in response to an electrical control signal (first and third embodiments) or a thermal control signal (second embodiment) or an electromagnetic control signal (fourth embodiment). The thermal control signal of the second embodiment may be delivered by an electromagnetic wave. These reconfigurable photonic metamaterials provide a flexible platform for the realization of tunable metamaterials for the optical part of the spectrum. By placing nanoscale plasmonic resonators with useful functionalities at optical frequencies on reconfigurable support structures, their interaction can be controlled, which leads to large-range tunability of the system's electromagnetic properties. Potential applications of this generic approach include optical temperature sensors, tunable spectral filters, switches, modulators and any other planar metamaterial device where tunability is required or desirable. Reconfigurable photonic metamaterials can be prototyped by focused ion beam milling or electron beam lithography and could be mass-produced by standard semiconductor manufacturing techniques.

Some example applications of the above-described structures are now described.

Metamaterial structures according to the various embodiments described thus far can be utilized in a wide range of optical and optoelectronic devices, such as measurement and sensing devices, and devices for modifying or modulating properties and characteristics of an optical beam.

Figure 14:
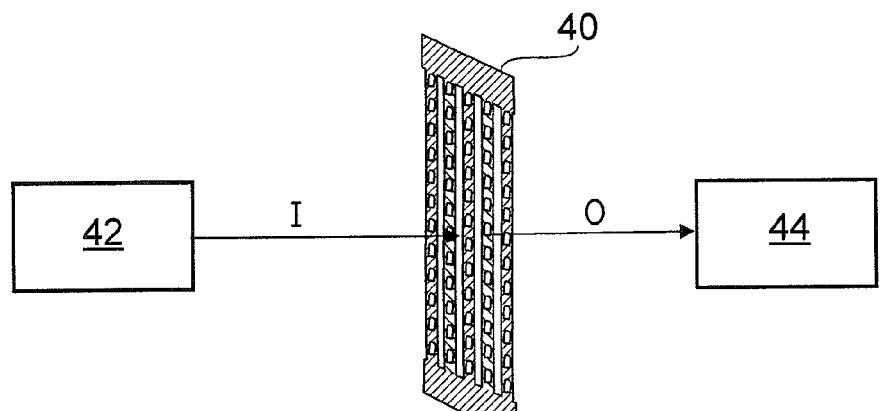
FIG. 14 is a schematic depiction of a temperature sensor including a metamaterial structure according to embodiments of the invention.

FIG. 14 is a schematic depiction of a first example device. In this example, a metamaterial structure 40 is configured for thermal tuning, and is utilized in a temperature sensor. An optical source 42 such as a laser emits an input beam I which is incident on the metamaterial structure 40. The beam is wholly or partially transmitted through the structure, and the resulting output beam O is collected by a detector 44 such as a photodetector or a spectrometer. Any changes in temperature will tune the transmission characteristics of the metamaterial structure 40, so that the output beam O is modified. Analysis of the output beam O as detected by the detector 44, compared with the input beam, can thus yield a measurement of the temperature at the location of the structure 40. The individual components can be positioned far apart if desired, so that remote temperature sensing can be carried out. Also, the sensor could be arranged so that a reflected output beam O is detected.

The arrangement shown in FIG. 14 can also be used to measure the intensity of the input beam I, if the input beam is of sufficiently high intensity to either control the temperature of the metamaterial structure 40 (configured for thermal tuning) or to deform the metamaterial 40 (configured for electromagnetic tuning) via electromagnetic forces between metamolecular resonators on different bridges.

Figure 15A:
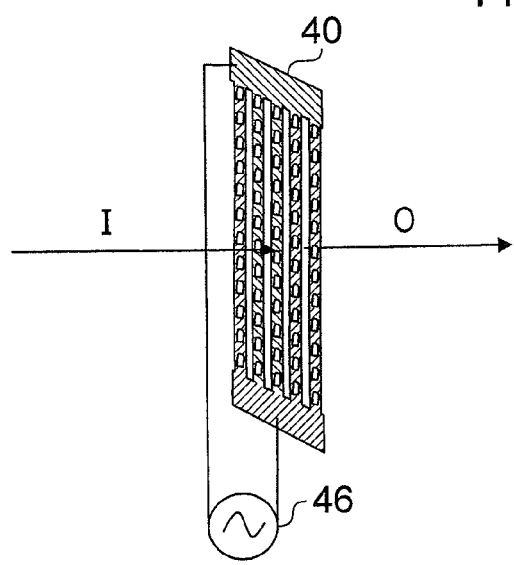
FIGS. 15a and 15b are schematic depictions of electro-optic switches based on metamaterial structures according to embodiments of the invention.
Figure 15B:
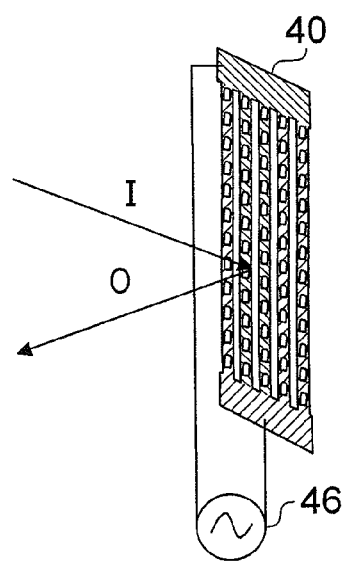

FIG. 15a is a schematic depiction of a second example device, in which a metamaterial structure 40 is used as an electro-optic switch. The structure 40 is configured as an electrically tunable structure, with an electric control signal supplied from a source 46. The electric tuning may be according to the first or third embodiments. As illustrated, the switch is "on", in that an input beam I is transmitted through the structure to give an output beam O. By application of an appropriate electric control signal, the transmission/reflection characteristic of the structure 40 can be altered so that the input beam is no longer transmitted, and the switch is turned "off". The switch can alternatively be configured to operate in reflection, where the output beam O is reflected from the structure 40. This arrangement is shown in FIG. 15b.

Figure 16A:
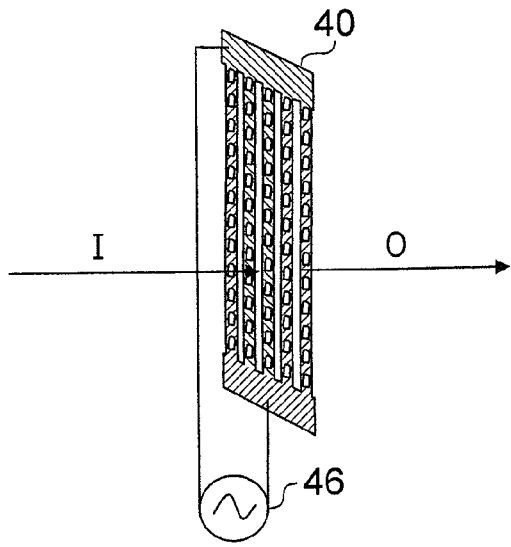
FIGS. 16a and 16b are schematic depictions of electro-optic modulators based on metamaterial structures according to embodiments of the invention.
Figure 16B:
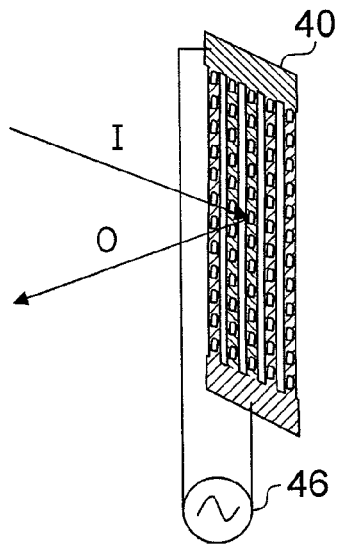

Similarly, a metamaterial structure can be used as an electro-optic modulator. As with an electro-optic switch, the modulator can be arranged for operation in transmission (FIG. 16a) or reflection (FIG. 16b). In these examples, though, an electrical control signal from source 46 is applied to an electrically tunable structure 40 to tune the transmission/reflection characteristic of the structure so that properties such as amplitude, phase, polarization and frequency of an input beam I incident on the structure 40 are modulated.

Figure 17A:
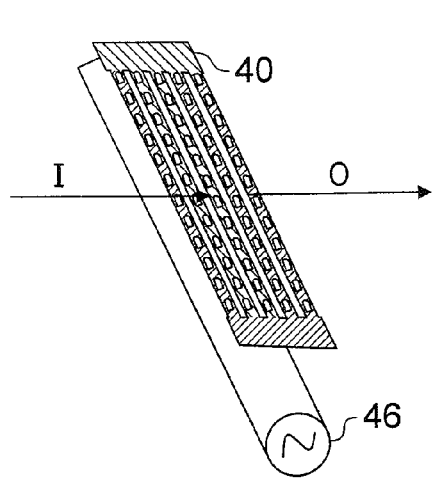
FIGS. 17a and 17b are schematic depictions of tunable polarization rotators based on metamaterial structures according to embodiments of the invention.
Figure 17B:
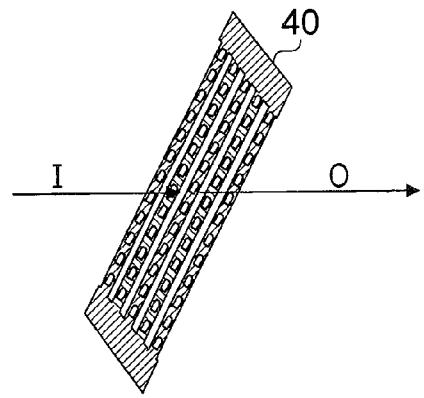

FIG. 17a shows a further example device in which a metamaterial structure 40 according to electrically tunable embodiments of the invention is used as a tunable polarization rotator. FIG. 17b shows a similar device based on a thermally tunable or electromagnetically tunable metamaterial structure. In each arrangement, the metamaterial structure is designed so that the metamaterial lacks two-fold rotational symmetry. The structure is positioned so that the input beam I is at an oblique incidence, and the polarization of the output beam O can be controlled by changing the orientation of the structure 40 with respect to the input beam I, or by altering the applied electric, thermal or optical control parameter.

Figure 18A:
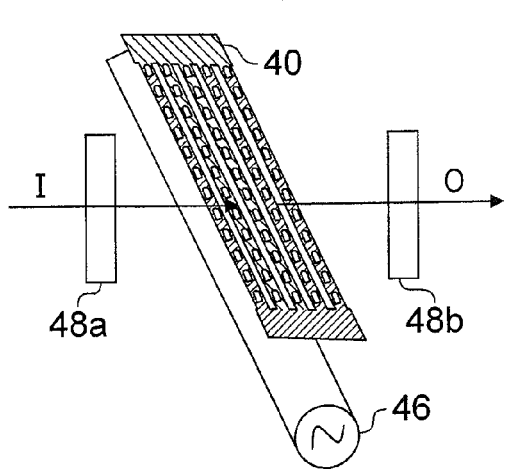
FIGS. 18a and 18b are schematic depictions of tunable polarization spectral filters based on metamaterial structures according to embodiments of the invention.
Figure 18B:
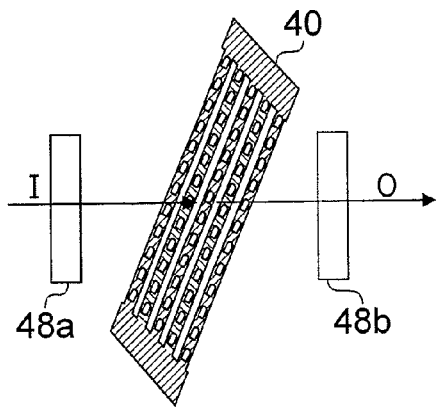

FIG. 18a shows an example device in which a metamaterial structure 40 is employed to realize a tunable polarization spectral filter. The structure 40, which in this example is configured for electrical tuning via an electrical control signal from a source 46, is optically active, and is placed between two crossed or substantially crossed polarizers. The input beam I passes through a first polarizer 48a before reaching the structure 40 and passing through a second polarizer 48b to produce an output beam O. The control signal is altered to control the transmission characteristics as required. A temperature-tunable or optically tunable metamaterial structure can alternatively be used, as shown in FIG. 18b.

Figure 19A:
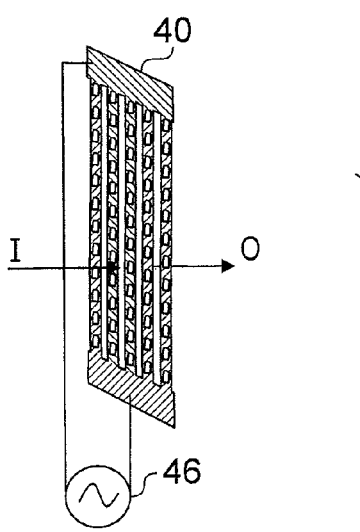
FIGS. 19a, 19b and 19c are schematic depictions of tunable wave plates based on metamaterial structures according to embodiments of the invention.
Figure 19B:
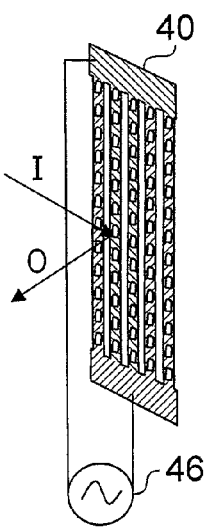
Figure 19C:
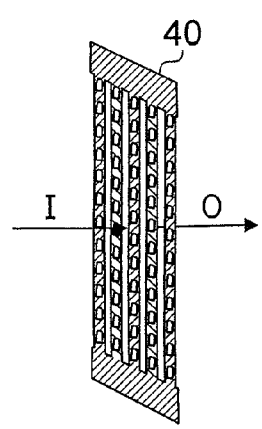

FIGS. 19a-c show examples of a metamaterial structure 40 utilized as a tunable wave plate. The tunable metamaterial has similar transmission for substantially linearly polarized eigenpolarizations. The metamaterial structure can be arranged for use in transmission (FIGS. 19a and 19c) or reflection (FIG. 19b), and tuning of the waveplate can be via an electrical control signal (FIGS. 19a and 19b) or by temperature or input beam intensity (FIG. 19c).

Figure 20A:
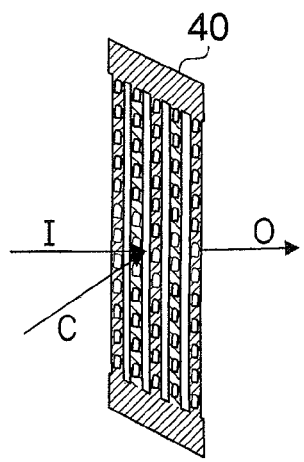
FIGS. 20a, 20b and 20c are schematic depictions of tunable modulators (or switches) based on electromagnetically controlled metamaterial structures according to embodiments of the invention.
Figure 20B:
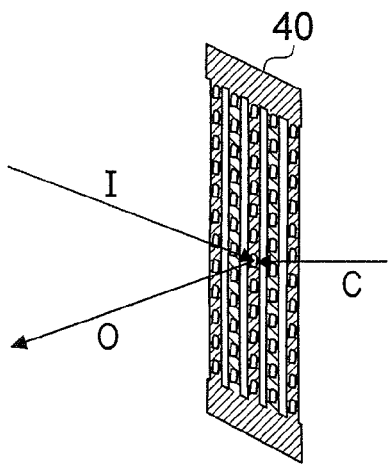
Figure 20C:
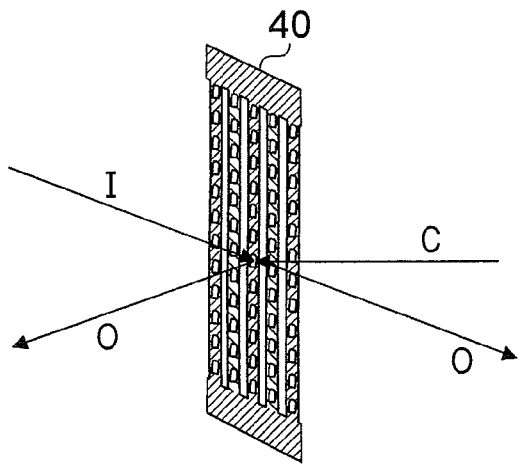

FIGS. 20a-c show further example devices in which a metamaterial structure 40 according to electromagnetically (optically) tunable embodiments of the invention is used as modulator or switch. By application of a control beam C, the transmission/reflection characteristic of the structure 40 can be altered so that properties such as amplitude, phase, polarization and frequency of an input beam I incident on the structure 40 are modulated. The output beam is marked O. The device can be configured to operate in transmission (FIG. 20a) or reflection (FIG. 20b). Realizations may also use both transmitted and reflected beams simultaneously as output beams (FIG. 20c), and more than one control beam could be used.

Figure 21A:
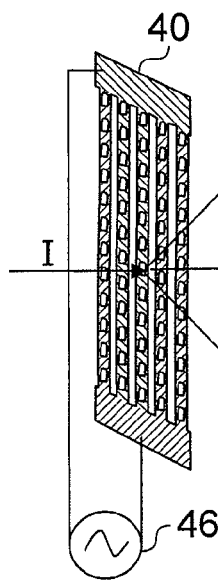
FIGS. 21a and 21b are schematic depictions of tunable diffraction gratings based on metamaterial structures according to embodiments of the invention.
Figure 21B:
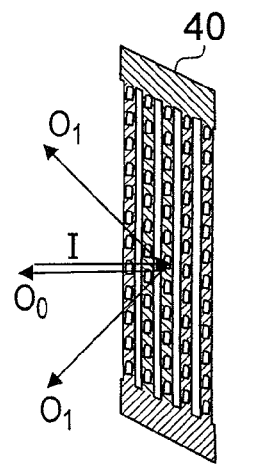

FIGS. 21a and 21b show further example devices in which a metamaterial structure 40 is employed to realize a tunable diffraction grating. The input beam I is incident on the metamaterial structure 40 and is split into several diffracted beams. Zeroth order $O_0$ and first order $O_1$ diffracted beam are indicated, but higher order diffracted beams may also exist. Tuning may be controlled by an electric control signal (FIG. 21a) or by an electromagnetic (optical) or thermal control signal (FIG. 21b) and the diffraction grating may operate in transmission (FIG. 21a) or reflection (FIG. 21b) or both.

It is to be understood that the above-described devices are examples only, and the invention is not limited thereby. Other applications of the tunable metamaterial structures and further devices incorporating the structures will be apparent to the skilled person.

REFERENCES (1) Zheludev, N. I. Opt. Photonics News 2011, 22, 30-35.
(2) Chen, H.-T.; Padilla, W. J.; Zide, J. M. O.; Gossard, A. C.; Taylor, A. J.; Averitt, R. D. Nature 2006, 444, 597-600.
(3) Kanda, N.; Konishi, K.; Kuwata-Gonokami, M. Opt. Lett. 2009, 34, 3000-3002.
(4) Nikolaenko, A. E.; Angelis, F. D.; Boden, S. A.; Papasimakis, N.; Ashburn, P.; Fabrizio, E. D.; Zheludev, N. I. Phys. Rev. Lett. 2010, 104, 153902.
(5) Samson, Z. L.; MacDonald, K. F.; De Angelis, F.; Gholipour, B.; Knight, K.; Huang, C.-C.; Fabrizio, E. D.; Hewak, D. W.; Zheludev, N. I. Appl. Phys. Lett. 2010, 96, 143105.
(6) Driscoll, T.; Kim, H. T.; Chae, B. G.; Kim, B. J.; Lee, Y. W.; Jokerst, N. M.; Palit, S.; Smith, D. R.; Ventra, M. D.; Basov, D. N. Science 2009, 325, 1518-1521.
(7) Wang, F.; Zhang, Y.; Tian, C.; Girit, C.; Zettl, A.; Crommie, M.; Shen, Y. R. Science 2008, 320, 206-209
(8) Zheludev, N. I. Science 2010, 328, 582-583.
(9) Tao, H.; Strikwerda, A. C.; Fan, K.; Padilla, W. J.; Zhang, X.; Averitt, R. D. Phys. Rev. Lett. 2009, 103, 147401.
(10) Zhu, W. M.; Liu, A. Q.; Zhang, X. M.; Tsai, D. P.; Bourouina, T.; Teng, J. H.; Zhang, X. H.; Guo, H. C.; Tanoto, H.; Mei, T.; Lo, G. Q.; Kwong, D. L. Adv. Mater. 2011, 23, 1792-1796.
(11) Prasanna, S.; Spearing, S. M. J. Microelectromech. S. 2007, 16, 248-259.
(12) Lapine M.; Powell D.; Gorkunov M.; Shadrivov I.; Marqués R.; Kivshar Y. Appl. Phys. Lett. 2009, 95, 084105.
(13) Zhao R.; Tassin T.; Koschny T.; Soukoulis C. M.; Opt. Express 2010, 18, 25665-25676.

What is claimed is:

1. A tunable metamaterial structure comprising a membrane having an area that is subdivided into a plurality of strips each extending continuously in a first dimension between a first end support and a second end support, wherein at least a subset of the strips is elastically deformable so as to permit motion of substantially the whole strip between the first end support and the second end support, with neighboring strips being spaced apart in a second dimension by gaps, wherein the area hosts a metamaterial formed by an array of metamaterial elements which at least partially cover the area of the strips and define a plurality of lattice parameters of the metamaterial, and wherein at least selected ones of the elastically deformable strips are shaped and dimensioned to permit their motion in response to a control parameter, thereby to cause neighboring strips to move relative to each other in a way that is substantially translation relative to each other and thereby perturb at least one lattice parameter of the metamaterial.

2. The structure of claim 1, wherein the membrane is provided with contacts to permit at least a subset of the strips to be electrically addressed with an electrical actuation signal which causes relative movement between neighboring strips.

3. The structure of claim 2, wherein the contacts are arranged to apply mutually attractive and repulsive electrostatic forces laterally between neighboring strips, so that a first subset of the gaps widen and a second subset of the gaps interleaved with the first subset narrow under application of the electrical actuation signal.

4. The structure of claim 2, wherein the contacts are arranged to apply a current to at least a first subset of the strips, and wherein at least a subset of the strips are made of a plurality of layers of different materials with different thermal expansion coefficients such that changes in temperature induced by the current cause bowing of those strips out of the plane of the membrane.

5. The structure of claim 1, wherein at least a first subset of the strips are made of a plurality of layers of different materials with different thermal expansion coefficients such that changes in temperature cause bowing of those strips out of the plane of the membrane.

6. The structure of claim 1, wherein a first subset and a second subset of strips are at least partially covered by metamaterial elements configured to exert mutually attractive and/or repulsive lateral electromagnetic forces on one other when excited with an electromagnetic wave, such that a first subset of gaps widens and a second subset of gaps interleaved with the first subset narrows under application of the electromagnetic wave.

7. The structure of claim 1, wherein the strips have more flexible end portions.

8. The structure of claim 7, wherein the more flexible end portions are formed as folded structures.

9. The structure of claim 1, wherein at least selected ones of the strips have lateral protrusions facing into the gaps to inhibit large area contact between neighboring strips.

10. The structure of claim 1, wherein the strips are formed as folded structures.

11. The structure of claim 1, wherein the strips have a periodicity in the second dimension matched to a lattice parameter of the metamaterial in the second dimension.

12. The structure of claim 11, wherein the matching is a one-to-one matching.

13. The structure of claim 1, wherein the lattice parameters of the metamaterial are smaller than at least one of 2000 nm, 1500 nm, 1250 nm, 1000 nm, 750 nm, 500 nm and 250 nm.

14. A tunable metamaterial device comprising a structure as claimed in claim 1 and a device controller operable to set the control parameter.

15. A method of operating a tunable metamaterial structure device, the method comprising:
    providing a membrane having an area that is subdivided into a plurality of strips each extending continuously in a first dimension between a first end support and a second end support, wherein at least a subset of the strips is elastically deformable so as to permit motion of substantially the whole strip between the first end support and the second end support, with neighboring strips being spaced apart in a second dimension by gaps, wherein the area hosts a metamaterial formed by an array of metamaterial elements which at least partially cover the area of the strips and define a plurality of lattice parameters of the metamaterial; and
    changing a control parameter to cause neighboring strips to move relative to each other in a way that is substantially translation relative to each other and thereby perturb at least one lattice parameter of the metamaterial.

16. The method of claim 15, wherein the membrane is provided with contacts to permit at least a subset of the strips to be electrically addressed with an electrical actuation signal which causes relative movement between neighboring strips.

17. The method of claim 15, wherein at least a first subset of the strips are made of a plurality of layers of different materials with different thermal expansion coefficients such that changes in temperature cause bowing of those strips out of the plane of the membrane, and wherein changing a control parameter comprises applying an electromagnetic wave to the device to cause a change in temperature.

18. An optical device for modifying an optical beam input to the device, the device comprising a tunable metamaterial structure according to claim 1.

19. A temperature sensor comprising:
    a tunable metamaterial structure according to claim 5;
    an optical source operable to produce an optical beam incident onto the tunable metamaterial structure; and
    an optical detector operable to receive the optical beam from the tunable metamaterial structure and determine a temperature at the tunable metamaterial structure by comparing the received optical beam and the incident optical beam.

* * * * *